US008880447B2

(12) United States Patent
Pearson et al.

(10) Patent No.: US 8,880,447 B2
(45) Date of Patent: Nov. 4, 2014

(54) SYSTEMS AND METHODS FOR MATCHING PEOPLE BASED ON PERCEIVED ACTIVITIES

(75) Inventors: Holly Pearson, Palm Harbor, FL (US); Gregory A. Pearson, Dunedin, FL (US); Ronald Shane Hamilton, St. Petersburg, FL (US); David B. Hall, New Port Richey, FL (US)

(73) Assignee: Gregory A. Pearson, Inc., Dunedin, FL (US)

( * ) Notice: Subject to any disclaimer, the term of this patent is extended or adjusted under 35 U.S.C. 154(b) by 361 days.

(21) Appl. No.: 12/943,553

(22) Filed: Nov. 10, 2010

(65) Prior Publication Data

US 2012/0072382 A1 Mar. 22, 2012

Related U.S. Application Data

(60) Provisional application No. 61/407,671, filed on Oct. 28, 2010, provisional application No. 61/384,944, filed on Sep. 21, 2010.

(51) Int. Cl.
| | | |
|---|---|---|
| *G06F 15/18* | (2006.01) | |
| *G06N 3/00* | (2006.01) | |
| *G06N 3/12* | (2006.01) | |
| *G06Q 50/00* | (2012.01) | |
| *G06Q 10/00* | (2012.01) | |
| *G06Q 30/02* | (2012.01) | |

(52) U.S. Cl.
CPC ............... *G06Q 30/02* (2013.01); *G06Q 50/01* (2013.01); *G06Q 10/00* (2013.01)
USPC ......... 706/13; 707/5; 707/14; 707/3; 709/224

(58) Field of Classification Search
None
See application file for complete search history.

(56) References Cited

U.S. PATENT DOCUMENTS

| 2003/0191673 A1* | 10/2003 | Cohen ............................ 705/5 |
| 2008/0126318 A1* | 5/2008 | Frankovitz ..................... 707/3 |
| 2009/0144273 A1* | 6/2009 | Kappos ........................... 707/5 |
| 2009/0164429 A1* | 6/2009 | Svendsen et al. ............... 707/3 |

* cited by examiner

*Primary Examiner* — Kakali Chaki
*Assistant Examiner* — Luis Sitoriche
(74) *Attorney, Agent, or Firm* — Troutman Sanders LLP; James E. Schutz; Jay R. Anderson, Jr.

(57) ABSTRACT

Matching systems and methods for social networking systems can select matches for users based on observed activities. A matching system can include, for example, a preference unit, a monitoring unit, and a matching unit. Generally, the preference unit can receive and process matching preference information for a user; the monitoring unit can monitor the user's activities on or observable by the server; and the matching unit can select and recommend matches for the user based on the monitored activities. Thus, matches can be suggested to the user based on the user's observed activities, and not simply based on the user's potentially inaccurate self-description.

20 Claims, 4 Drawing Sheets

SYSTEMS AND METHODS FOR MATCHING PEOPLE BASED ON PERCEIVED ACTIVITIES

CROSS-REFERENCE TO RELATED APPLICATIONS

This application claims a benefit, under 35 U.S.C. §119(e), of U.S. Provisional Application Ser. No. 61/384,944, filed 21 Sep. 2010, and U.S. Provisional Application Ser. No. 61/407,671, filed 28 Oct. 2010, the entire contents and substance of both of which are hereby incorporated by reference.

TECHNICAL FIELD

Various embodiments of the present invention relate to social networking systems and, more particularly, to systems and methods for matching people in a social networking system based on perceived activities.

BACKGROUND

A great benefit of social networking websites is their ability to connect people to one another and thus establish and nurture important relationships, including both business and personal relationships. Unfortunately, however, social networking websites have yet to be effectively leveraged to connect people who do not know each other, based on observed characteristics of those people.

Dating websites, such as eHarmony® and Match.com®, suggest romantic matches based on information that individuals provide about themselves for the purpose of matching. This type of matching is inherently flawed because it depends on individuals correctly describing how others perceive them. Furthermore, many users of these dating websites already have an idea of the type of person they would like to date. Thus, either consciously or subconsciously, a user may provide inaccurate information, so as to meet that certain type of person regardless of whether that type is truly compatible with the user.

A social networking website, Facebook®, matches people based on mutual contacts. For example, if two people have multiple mutual contacts, Facebook may suggest that the two people connect with each other. This system of people-matching is useful for locating people who already know each other but have not yet connected on Facebook. The Facebook matching system, however, is not particularly useful for matching people who do not yet know each other, as two such people likely have no mutual contacts.

The above systems are unable to effectively suggest matches between strangers based on verified activities or behaviors of the strangers. Any matching that occurs with the above systems is based on subjective and possibly inaccurate information, or is useful only for matching people who already know each other.

SUMMARY

There is a need for a matching system to match people based on actual, perceived behaviors. Such a matching system could monitor or record activities of individuals and then suggest matches based on similar or complimentary activities. It is to such a system, and related methods, to which various embodiments of the invention are directed.

Briefly described, various embodiments of the present invention are matching systems and methods for matching people based on observed activities. An exemplary embodiment of a matching system can be embodied on a computing device and can comprise a preference unit, a monitoring unit, and a matching unit.

The preference unit can receive preference information from users of the system. For example, and not limitation, a user can specify to the preference unit whether the user would like to be matched, whether matching is to occur automatically or on-demand, what activities may be considered for matching, gender preference for matches, age preference for matches, or whether the desired matching is for business, friendship, or dating. The preference unit can store the received preference information for the user and can link the preference information a user account of the user.

The monitoring unit can monitor a user's activities or behaviors observable by the matching system. The matching system can be integrated into or otherwise associated with a social networking system, and the monitoring unit can thus monitor the user's activities on a website of the social networking system. The monitored activates can include, for example, listening to music, watching digital videos, and chatting with celebrities or featured individuals registered with the website. The monitoring unit can store and periodically update a record, associated with the user's account, of the user's monitored activities.

The matching unit can receive data from the preference unit and the monitoring unit, such as by accessing preferences and activity data associated with a user's account. The matching unit can utilize a predetermined algorithm, which can depend at least partially on the user's preferences, to select potential matches for the user. The matching unit can then display the selected matches to the user according to the user's display preferences. Thus, matches can be suggested to the user based on the user's observed activities, and not simply based on the user's suspect self-description.

These and other objects, features, and advantages of the matching system will become more apparent upon reading the following specification in conjunction with the accompanying drawing figures.

DETAILED DESCRIPTION

Figure 1:
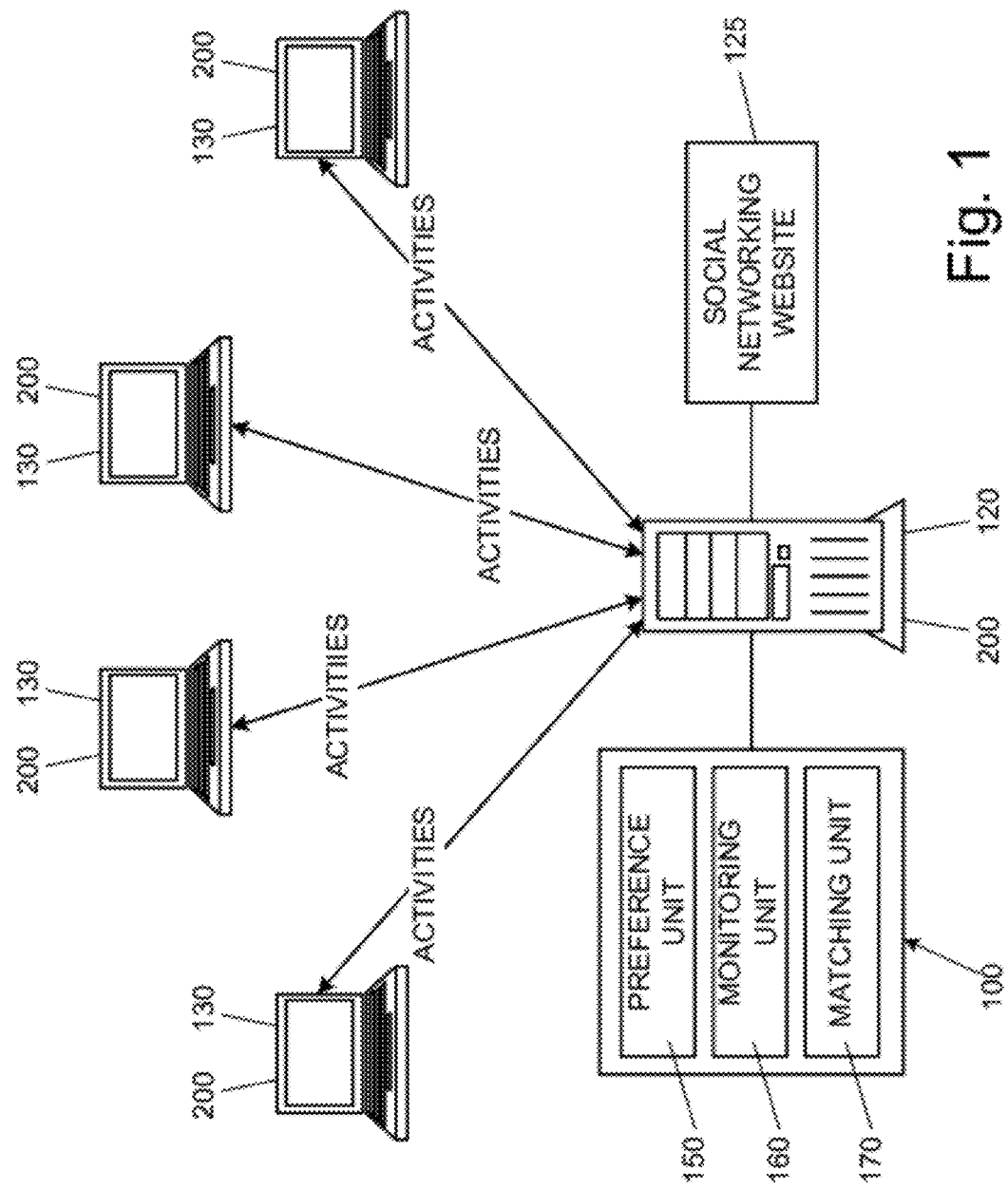
FIG. 1 illustrates a matching system, according to an exemplary embodiment of the present invention.

To facilitate an understanding of the principles and features of the invention, various illustrative embodiments are explained below. In particular, the invention is described in the context of being a matching system for suggesting romantic matches for individuals. Embodiments of the invention, however, are not limited to this context. Rather, embodiments of the invention can match organizations, individuals, or other entities for business or personal purposes.

The matching system is described below as being embodied in a web environment, but a web environment is not required for all embodiments of the matching system. References to web components throughout this disclosure are for convenience and should not be considered limiting. For example, and not limitation, embodiments of the matching system can be implemented in local area networks, media centers, or video game consoles. The components described hereinafter as making up various elements of the invention are intended to be illustrative and not restrictive. Many suitable components that can perform the same or similar functions as components described herein are intended to be embraced within the scope of the invention. Such other components not described herein can include, but are not limited to, similar or analogous components developed after development of the invention.

Various embodiments of the present invention are matching systems to select matches for users of the system, based on observed activities of the users. Referring now to the figures, in which like reference numerals represent like parts throughout the views, various embodiment of the matching system will be described in detail.

FIG. 1 illustrates a matching system 100, according to an exemplary embodiment of the present invention. In general, the matching system 100 can observe activities of its users and can compare the activities of a first user with the activities of other users. Based on the similarities or complementariness of the compared activities, the matching system 100 can select one or more of the other users as matches for the first user. Unlike conventional matching systems, which propose matches based on questionnaires, the matching system 100 can suggest matches based on actual, perceived activities, which are more likely to accurately represent the user than are answers to questions.

The matching system 100 can be embodied in a computer-readable medium and executed by a computer processor on a computing device 200 to provide one, some, or all aspects of the invention. As shown in FIG. 1, the matching system 100 can be integrated, in whole or in part, in a computing device 200, which can behave as or include a server 120. The server 120 can provide services to remote computing devices 200, such as various clients 130 located remotely from the server 120.

Figure 2:
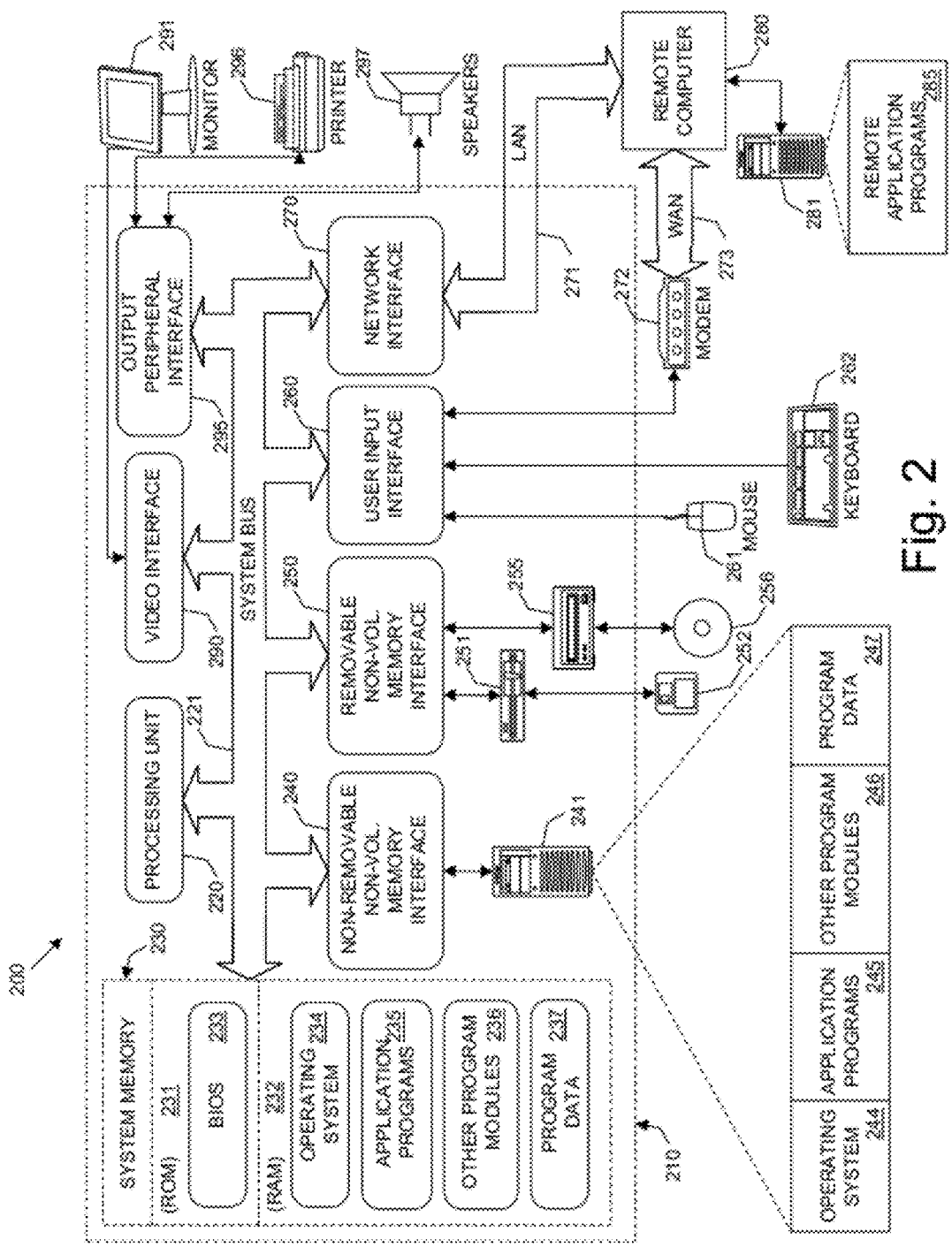
FIG. 2 illustrates an architecture of a computing device on which the matching system can be implemented, according to an exemplary embodiment of the present invention.

FIG. 2 illustrates an example of a suitable computing device 200 that can be used as or can comprise a client 130 or a server 120, in an exemplary embodiment in the matching system 100. Although specific components of a computing device 200 are illustrated in FIG. 2, the depiction of these components in lieu of others does not limit the scope of the invention. Rather, various types of computing devices can be used to implement embodiments of the matching system 100. Exemplary embodiments of the matching system 100 can be operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, mini-computers, mainframe computers, distributed computing environments that include any of the above systems or devices, and the like.

Exemplary embodiments of the matching system 100 can be described in a general context of computer-executable instructions, such as one or more applications or program modules, stored on a computer-readable medium and executed by a computer processing unit. Generally, program modules can include routines, programs, objects, components, or data structures that perform particular tasks or implement particular abstract data types. Embodiments of the matching system 100 can also be practiced in distributed computing environments, where tasks are performed by remote processing devices that are linked through a communications network. In a distributed computing environment, the server 120 can comprise multiple computing devices 200, and processes that would otherwise be performed by the server 120 can be executed by clients 130 or other devices located remotely from one another.

With reference to FIG. 2, components of the computing device 200 can comprise, without limitation, a processing unit 220 and a system memory 230. A system bus 221 can couple various system components including the system memory 230 to the processing unit 220. The system bus 221 can be any of several types of bus structures including a memory bus or memory controller, a peripheral bus, and a local bus using any of a variety of bus architectures. By way of example, and not limitation, such architectures can include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing device 200 can include a variety of computer readable media. Computer-readable media can be any available media that can be accessed by the computing device 200, including both volatile and nonvolatile, removable and non-removable media. For example, and not limitation, computer-readable media can comprise computer storage media and communication media. Computer storage media includes both volatile and nonvolatile, removable and non-removable media implemented in any method or technology for storage of information such as computer readable instructions, data structures, program modules or other data. Computer storage media can include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store data accessible by the computing device 200.

Communication media can typically contain computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, and not limitation, communication media includes wired media such as a wired network or direct-wired connection, and wireless media such as acoustic, RF, infrared and other wireless media. Combinations of any of the above can also be included within the scope of computer readable media.

The system memory 230 can comprise computer storage media in the form of volatile and/or nonvolatile memory such as read only memory (ROM) 231 and random access memory (RAM) 232. A basic input/output system 233 (BIOS), containing the basic routines that help to transfer information between elements within the computing device 200, such as during start-up, can typically be stored in the ROM 231. The RAM 232 typically contains data and/or program modules that are immediately accessible to and/or presently in operation by the processing unit 220. For example, and not limitation, FIG. 2 illustrates operating system 234, application programs 235, other program modules 236, and program data 237.

The computing device 200 can also include other removable/non-removable, volatile/nonvolatile computer storage media. By way of example only, FIG. 2 illustrates a hard disk drive 241 that can read from or write to non-removable, nonvolatile magnetic media, a magnetic disk drive 251 for reading or writing to a nonvolatile magnetic disk 252, and an optical disk drive 255 for reading or writing to a nonvolatile optical disk 256, such as a CD ROM or other optical media. Other removable/non-removable, volatile/nonvolatile computer storage media that can be used in the exemplary operating environment can include magnetic tape cassettes, flash memory cards, digital versatile disks, digital video tape, solid state RAM, solid state ROM, and the like. The hard disk drive 241 can be connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2 can provide storage of computer readable instructions, data structures, program modules and other data for the computing device 200. For example, hard disk drive 241 is illustrated as storing an operating system 244, application programs 245, other program modules 246, and program data 247. These components can either be the same as or different from operating system 234, application programs 235, other program modules 236, and program data 237.

A web browser application program 235, or web client, can be stored on the hard disk drive 241 or other storage media. The web client can comprise an application program 235 for requesting and rendering web pages, such as those created in Hypertext Markup Language ("HTML") or other markup languages. The web client can be capable of executing client side objects, as well as scripts through the use of a scripting host. The scripting host executes program code expressed as scripts within the browser environment. Additionally, the web client can execute web application programs 235, which can be embodied in web pages.

A user of the computing device 200 can enter commands and information into the computing device 200 through input devices such as a keyboard 262 and pointing device 261, commonly referred to as a mouse, trackball, or touch pad. Other input devices (not shown) can include a microphone, joystick, game pad, satellite dish, scanner, electronic white board, or the like. These and other input devices are often connected to the processing unit 220 through a user input interface 260 coupled to the system bus 221, but can be connected by other interface and bus structures, such as a parallel port, game port, or a universal serial bus (USB). A monitor 291 or other type of display device can also be connected to the system bus 221 via an interface, such as a video interface 290. In addition to the monitor, the computing device 200 can also include other peripheral output devices such as speakers 297 and a printer 296. These can be connected through an output peripheral interface 295.

The computing device 200 can operate in a networked environment using logical connections to one or more remote computers, such as a remote computer 280. The remote computer 280 can be a personal computer, a server, a router, a network PC, a peer device, or other common network node, and can include many or all of the elements described above relative to the computing device 200, including a memory storage device 281. The logical connections depicted in FIG. 2 include a local area network (LAN) 271 and a wide area network (WAN) 273, but can also include other networks.

When used in a LAN networking environment, the computing device 200 can be connected to the LAN 271 through a network interface or adapter 270. When used in a WAN networking environment, the computing device 200 can include a modem 272 or other means for establishing communications over the WAN 273, such as the internet. The modem 272, which can be internal or external, can be connected to the system bus 221 via the user input interface 260 or other appropriate mechanism. In a networked environment, program modules depicted relative to the computing device 200 can be stored in the remote memory storage device. For example, and not limitation, FIG. 2 illustrates remote application programs 285 as residing on memory device 281. It will be appreciated that the network connections shown are exemplary and other means of establishing a communications link between the computers can be used.

Referring now back to FIG. 1, the matching system 100, on or accessible by the server 120, can comprise one or more units for capturing and exploiting data about users, so as to effectively match those users. The units of the matching system 100 can be programs, program modules, or other operative components of the matching system 100. These units can comprise, for example, a preference unit 150, a monitoring unit 160, and a matching unit 170. Generally, the preference unit 150 can receive and process matching preference information for a user; the monitoring unit 160 can monitor the user's activities on or observable by the server 120; and the matching unit 170 can select and recommend matches for the user based on the monitored activities. Although these units are described below as being distinct components of the matching system 100, this need not be the case. The units are distinguished herein based on operative distinctiveness, but they can be implemented in various fashions, wherein the elements or components making up the various units can overlap or be divided in a manner other than that described below.

Before receiving matches, a user can register with the matching system 100, thereby indicating to the matching system 100 that matches are desired by the user. After completion of the registration process, a matching account can be created for the user. In an exemplary embodiment, the matching system 100 is integrated in or otherwise associated with another system, such as a social networking system. In such an embodiment, the user's matching account can be associated with or part of an account of the user on the social networking system. Thus, the user can create or modify his preferences through the social networking system.

After registration, the user can provide the matching system 100 with information about the user's preferences for matches, and these preferences can be received and stored by the preference unit 150. The preference unit 150 can provide the user with a form, through which the user can enter and submit preferences. The user's preferences can include, for example, whether selected matches are to be presented to the user automatically or on-demand, what activities may be monitored for matching, gender preference for matches, age preference for matches, and whether the matching is for business, friendship, or dating. The preference unit 150 can store the received preference information in the user's matching account.

The monitoring unit 160 can monitor information about the user's activities that are accessible by the server 120. These activities can be stored in an activity data set associated with the user's account and stored on the server 120 or on the user's local client computer 130. The monitoring unit 160 can monitor and store information about various users of the matching system 100, and can store the observed information about each user in a corresponding activity data set for that user. Thus, to identify matches for a particular user, the matching unit 170 can then compare that particular user's activity data set with the activity data sets of other users of the matching system 100, to determine similarities and complementariness.

As mentioned above, an exemplary embodiment of the matching system 100 can be tied to a social networking system. In such an embodiment, the social networking system can include a website 125, on which users can conduct various activities observable by the monitoring unit 160 of the matching system 100. The website 125 can be serviced by the same server 120 of the matching system 100, thus further integrating the matching system 100 with the social networking system and facilitating the monitoring unit's access to activities performed by users on the website 125.

The monitoring unit's access to activities on the website 125 can take various forms. For example, and not limitation, the associated social networking system can maintain logs for activities of all users, regardless of participation in the matching system 100, and the monitoring unit 160 can access these logs for matching purposes. Alternatively, after a user registers with the matching system 100, the monitoring unit 160 can receive information about the user's activities on the website 125 on an ongoing basis, and the monitoring unit 160 can record these activities directly into the activity data set for the user, or in a log or some other form of storage. If the user's activities are maintained internally by the monitoring unit 160, instead of by an external component of the social networking system, the logged activities can be limited to those activities indicated in the user's preferences as being available for consideration by the matching system 100.

The range of activities observable by the monitoring unit 160 can depend on the capabilities of the website 125 and activities performable by users on the website. For example, and not limitation, the website 125 can provide a media player enabling the user to play music or videos that the user selects for himself. The website 125 can also enable the user to chat with celebrities or to subscribe to updates about celebrities, local events, or other news feeds. The monitoring unit 160 can monitor some or all of these and other activities performed by the user on the website 125.

Observable activities can also include activities occurring locally at the user's client computer 130. In other words, in addition to monitoring activities occurring on the website 125, the monitoring unit 160 can also monitor activities occurring on the user's client computer 130. For example, and not limitation, the monitoring unit 160 can upload or log the user's activities related to known multimedia applications, such as iTunes® or Windows Media Player®, and related to attached devices, such as iPods® or other MP3 players. The monitoring unit 160 can access playlists and media stored on the user's hard drive and attached devices. Based on the user's preferences, the monitoring unit 160 can access this local information once, such as upon initialization, or every time the user connects to the matching system 100, so as to maintain updated records of the user's local activities. The matching system 100 can thus consider what media the user has stored on the client computer 130 and how often that media has been used in the past.

The matching unit 170 can select other users of the matching system 100 as potential matches for the current user, based at least partially on the current user's preferences and the user's monitored activities. Thus, potential matches can be filtered by criteria entered by the user about desired matches, and activities considered in selecting matches can be restricted to those activities indicated in the user's account preferences.

The matching unit 170 can be in communication with the monitoring unit 160, such as by accessing a log maintained by the monitoring unit 160, to obtain data relating to the user's activities and other users' activities. The matching unit 170 can analyze this activity data in light of a predetermined matching algorithm to select matches for the user.

The matching algorithm can score other users of the system to determine the compatibility of those other users with the current user. One or more other users with the highest scores can be selected as matches for the current user. Alternatively, instead of scoring, the algorithm can continuously eliminate other users as potential matches until a manageable number of other users remain, at which time the remaining users can be selected as matches for the current user. Further alternatively, each of the other users can be considered and selected as a match if the other user meets certain criteria, such as a certain level of similarity with the current user's activities.

If a scoring algorithm is used, then other users' scores can be increased for each observed, relevant similarity to the current user. For example, if another user often plays a song for which the current user has demonstrated an affinity, such as by likewise playing the song often, then that other user's score can increase for the similar affinity. Score increases can also result, for example, and not limitation: if the other user plays the same music, musical artist, or genre as the current user; if the other user has the same music, musical artist, or genre as the current user in a stored playlist; if the other user chats with a celebrity with whom the current user has also chatted; if the other user watches the same videos watched by the current user; if the other user has the same videos as the current user in a playlist; or if the other user subscribes to the same news feeds as the current user.

Not all similar activities need be weighted the same by the matching algorithm, and the degree to which each similar activity increases the other user's score can vary based on the importance of that activity, as defined by the matching algorithm. For example, repeatedly playing a particular song for which the current user has demonstrated an affinity can result in a greater score increase than playing songs of the same genre or simply having that particular song in one's playlist. Further, playing the particular song many times can result in a greater score increase than playing the song once or twice. In some embodiments, simply including a song on a playlist, without ever having played the song, may yield no score increase at all.

In addition to similar activities, complimentary activities can also be considered by the matching unit 170. For example, if the other user watches multiple videos about learning to play blues on the guitar, then that other user's score can be increased based on the current users' activities of playing blues guitar music. Additionally, in some embodiments, points can be deducted for activities that appear to be non-complementary to or incongruous with the current user's activities.

Figure 3:
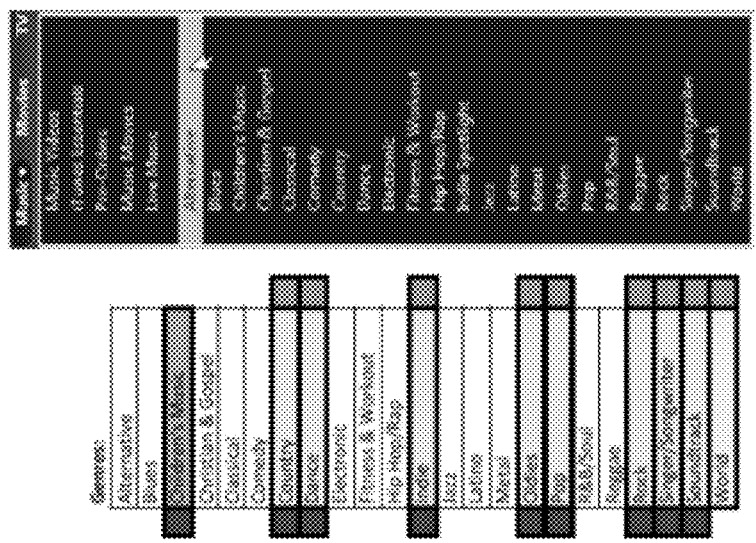
FIG. 3 illustrates an algorithm used to determine a matching percentage between users of the matching system, according to an exemplary embodiment of the present invention.
Figure 3:
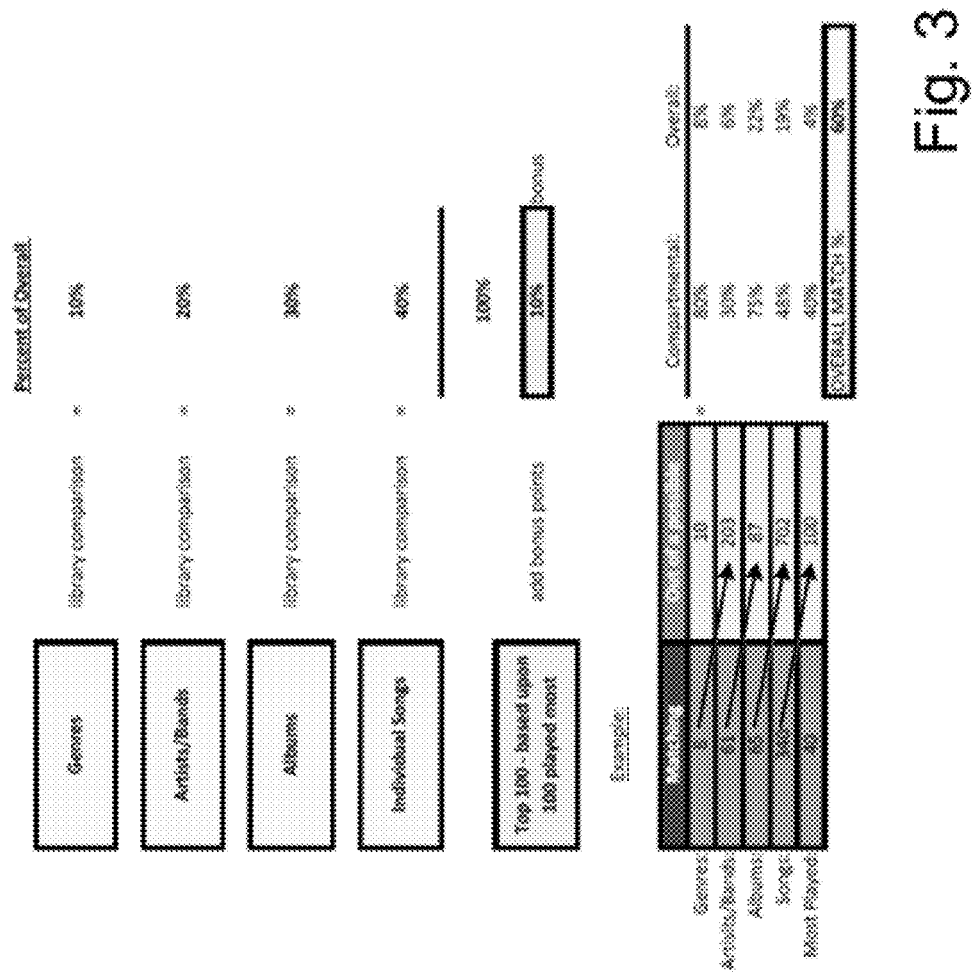

In some embodiments of the matching system 100, the matching score can be a percentage describing a degree of similarity of a second user as compared to a first user for whom matches are sought. FIG. 3 illustrates application of an exemplary algorithm used to determine a matching percentage for a second user, as compared to a first user. It will be understood that the illustrated algorithm is presented only as an example. Various other algorithms can be used alternatively or additionally to the specific algorithm illustrated in FIG. 3, to determine a matching percentage or score.

In some exemplary embodiments of the matching system 100, a second user's matching score, as compared to a first user to be matched, can be a weighted average of percentages by which the second user is deemed to be similar to the first user in one or more categories. For example, FIG. 3 illustrates that the matching score can be a weighted average of similarities in perceived preferences in musical genre, artists, albums, songs, and most played. More specifically, in the illustrated example, the genre, artist, and song preference can respectfully account for 10%, 20%, 30%, and 40% of a total base matching score, and most played songs can add a bonus of up to 10% of the total possible base score.

While, in the illustrated algorithm, all considered factors are related to music, this need not be the case. For example, and not limitation, the matching algorithm can be limited to movie comparisons or to some other activity type, or the matching algorithm can consider various different types of activities, such as, for example, some combination of music, movies, and browsing activities.

As shown in FIG. 3, in an exemplary application of the illustrated algorithm, the matching system 100 can observe that each of the first and second users listens to 9 genres of music, for a combined total of 10 genres, 8 of which overlap between the users. Of those 8 overlapping genres, the matching system 100 can observe that the two users listened to a combined total of 203 artists, of which 61 overlap. Of those 61 artists, the two users have a combined 87 albums for those artists in their libraries, of which 65 of those albums are in both libraries and thus overlap. Of the 65 overlapping albums, 702 songs are identified as being in either of the users' libraries, and 340 of those songs are identified as being in both libraries. Of those 340 overlapping songs, 40 of those songs are identified as being in both users' "Top 100" lists, or other favorites or most-played lists. Based on this data, as shown, the matching unit 170 can calculate a matching percentage of 60% between the two users, which can correspond to a matching score of 60 for the second user, as compared to the first user.

Regardless of the matching algorithm used, the matching unit 170 can score or otherwise evaluate potential matches based on the algorithm. After users are scored or otherwise evaluated, the matching unit 170 can select, or at least preliminarily select, one or more of the other users whose evaluations by the matching algorithm meet one or more predetermined selection criteria. In some exemplary embodiments, the other users who meet the selection criteria are only preliminarily selected, and can be further filtered based on the first user's indicated preferences, before the selection as matches becomes finalized. The selection criteria used by the matching unit 170, after application of the matching algorithm, can vary based on implementation. For example, in an exemplary embodiment, a predetermined number of other users with the highest matching scores can be selected, or preliminarily selected. Alternatively, for another example, the matching unit 170 can select, or preliminarily select, all of the other users whose scores meet or exceed a predetermined threshold. After selections are finalized, the matching unit 170 can present the selected other users to the current user as matches, such as by providing the current user with links to the selected other users' profile pages on the social networking system.

Figure 4:
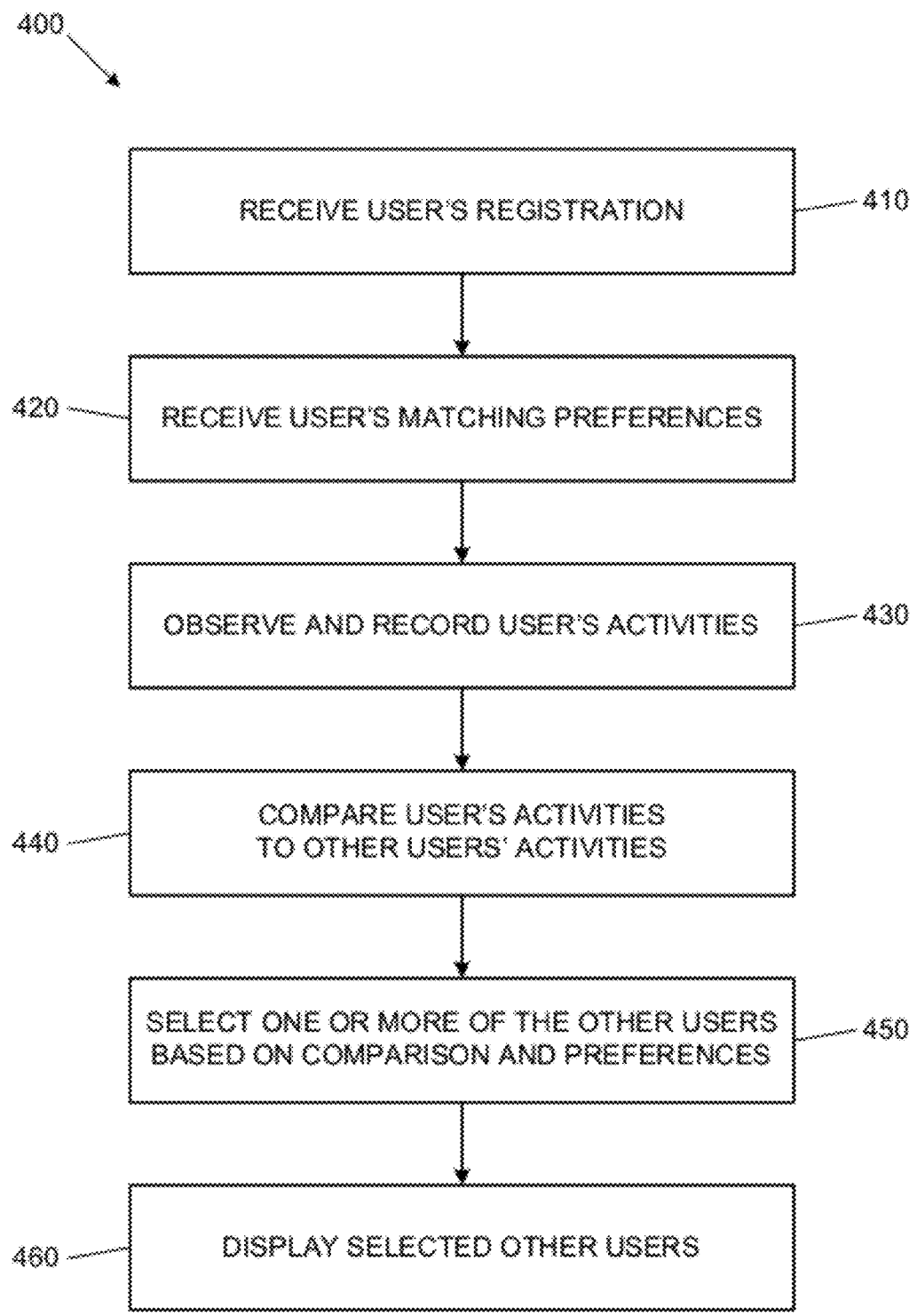
FIG. 4 illustrates a flow diagram of a method of matching users of the matching system, according to an exemplary embodiment of the present invention.

FIG. 4 illustrates a flow diagram of a method 400 for matching users, according to an exemplary embodiment of the present invention. Each box in FIG. 4 represents an action in the overall matching method 400. Those of skill in the art will appreciate that the actions illustrated in FIG. 4 need not be undertaken in the order illustrated, and one or more of the actions can be segments of other actions. Further, not all of the actions illustrated need be undertaken in every embodiment of the matching method 400, and additional actions can be provided as well.

As shown in FIG. 4, at 410, a user can register with the matching system 100, thereby permitting the matching system 100 to monitor and record, or otherwise access, the user's activities that are observable by the monitoring unit 160. After or during the registration, at 420, the user can provide his or her preferences for the matching system 100, which can be received by the preference unit 150. At 430, the user can perform one or more activities observable by the monitoring unit 160, and the monitoring unit 160 can observe and record these activities. At 440, the matching unit 170 can compare the user's recorded activities to those activities of other users, in accordance with an algorithm based partially on the user's preferences. At 450, the matching unit 170 can select one or more other users of the matching system 100 as matches for the user based on the user's activities and the selected users' activities recorded by the monitoring unit 160. At 460, the matching system 100 can display to the user a representation of the selected users, such as links to profile pages of the selected users.

As discussed above in detail, embodiments of the present invention can provide an effective means of determining compatibility based on similar or complimentary interests, by considering actual, observed activities, as opposed to suspect user-entered information. Thus, embodiments of the matching system 100 can effectively match individuals or other entities based on accurate characteristics.

While matching systems and methods has been disclosed in exemplary forms, many modifications, additions, and deletions may be made without departing from the spirit and scope of the system, method, and their equivalents, as set forth in the following claims.

What is claimed is:

1. A social-networking system comprising:
a preference unit for receiving a user selection indicating a type of media-selection behavior to monitor from among a plurality of presented types of media-selection behavior;
a monitoring unit for:
generating a first data set comprising information about the indicated type of media-selection behavior of a first user, wherein the first data set includes:
information about interactions, by the first user, with music resources accessed through a website; and
information about interactions, by the first user, with music resources stored on a media playback device in communication with a separate client computing device used to access the website; and
collecting a plurality of other data sets comprising information about media-selection behavior of a plurality of other users; and
a matching unit for:
comparing, by a processor, the first data set to each of the plurality of other data sets; and
selecting a subset of the plurality of other users as matches for the first user, based on application of a predetermined matching algorithm to the comparing of the first data set to each of the plurality of other data sets.

2. The system of claim 1, the predetermined matching algorithm being adapted to determine a respective matching score for each of the other users, and the matching unit being further for selecting matches for the first user based on the matching scores for the plurality of other users.

3. The system of claim 2, the respective matching score for each other user being a weighted average of similarity scores in two or more categories of music preferences associated with the first user and the respective other user.

4. The system of claim 1, the first data set comprising information about plays of music, by the first user, through the website.

5. The system of claim 1, the monitoring unit being configured to identify a frequency or number of times that a music track is played by the first user and to include an indication of the identified frequency or number in the first data set.

6. The system of claim 1, the plurality of other data sets comprising information about music played through the website by the plurality of other users, wherein the matching algorithm is adapted to consider music played by the first user as compared to music played by the plurality of other users.

7. The system of claim 1, the first data set comprising information about a music playlist or music library accessed through the website, the music playlist or music library associated with the first user.

8. The system of claim 1, the first data set comprising information about selections, by the first user, of one or more genres or artists of media.

9. The system of claim 8, the other data sets comprising information about selections on the website of one or more genres or artists of media by the plurality of other users, wherein the matching algorithm is adapted to consider the genres or artists of media selected by the first user as compared to the genres or artists of music selected by the plurality of other users.

10. The system of claim 1, the first data set comprising information about interactions, by the first user, related to at least one of movies, browsing history, favorite web pages, or instant messaging.

11. The social-networking system of claim 1, further comprising the website, wherein the user selection indicating the type of media-selection behavior to monitor is received through the website.

12. The social-networking system of claim 11, the matching unit further adapted to present, to the first user, through the website, an indication of one or more of the subset of the other users.

13. A method comprising:
monitoring ongoing music-listening behavior associated with a first user and occurring at least partially on a website;
generating a first data set comprising information based on the monitored music-listening behavior associated with the first user and information about music selected by the first user for a playlist or music library stored on a media playback device in communication with a separate client computing device used to access the website;
collecting a plurality of other data sets for a plurality of other users, wherein for each other user, a respective corresponding other data set comprises information based on music-listening behavior associated with the respective other user;
comparing the first data set associated with the first user to each of the other data sets for the plurality of other users;
applying, by a processor, a predetermined matching algorithm to the comparing of the first data set to each of the plurality of other data sets, to determine a respective matching score for each of the plurality of other users; and
selecting one or more of the plurality of other users as matches for the first user, responsive to determining that the matching scores for the one or more other users meet one or more predetermined selection criteria, including being among a predetermined number of highest matching scores among the respective matching scores for each of the plurality of other users.

14. The method of claim 13, wherein the respective matching score for each of the plurality of other users represents a degree of similarity between the first data set associated with the first user and the respective other data set corresponding to the respective other user.

15. The method of claim 13, the music-listening behavior associated with the first user comprising plays of music by the first user.

16. The method of claim 13, the first data set further comprising information about additions, by the first user, of music to a playlist associated with the first user.

17. A non-transitory transitory computer-readable medium embodying a computer program product, the computer program product comprising an algorithm adapted to effectuate a method comprising:
receiving from a first user, an indication of types of interactions with music resources to monitor and record;
monitoring and recording the indicated types of interactions of the first user with music resources on a website and with music resources on a media playback device in communication with a separate client computing device used to access the website;
monitoring and recording the indicated types of interactions of additional users, including a second user, with the music resources on the website;
comparing the recorded types of interactions of the first user with the recorded types of interactions of the additional users;
applying, by a processor, a predetermined matching algorithm to the comparing of the recorded interactions of the first user to the recorded interactions of the additional users, to determine a respective matching score for each of the additional users; and
suggesting the second user as a match for the first user responsive to determining the matching score for the second user meets one or more predetermined selection criteria, wherein the one or more predetermined selection criteria require that a matching score be one of a predetermined number of the highest matching scores among the additional users.

18. The non-transitory computer-readable medium of claim 17, the predetermined selection criteria requiring that the matching score meet or exceed a predetermined score threshold.

19. The non-transitory computer-readable medium of claim 17, the monitored and recorded interactions of the first user comprising music-listening activities on the website and on the media playback device.

20. The non-transitory computer-readable medium of claim 19, the monitored and recorded interactions of the second user comprising the second user's music-listening activities on the website, wherein the matching score of the second user at least partially depends on similarity between the music-listening activities of the first user and the music-listening activities of the second user.

* * * * *

UNITED STATES PATENT AND TRADEMARK OFFICE
CERTIFICATE OF CORRECTION

PATENT NO. : 8,880,447 B2  
APPLICATION NO. : 12/943553  
DATED : November 4, 2014  
INVENTOR(S) : Holly Pearson et al.

Page 1 of 1

It is certified that error appears in the above-identified patent and that said Letters Patent is hereby corrected as shown below:

In the Claims

Column 12, Line 20, Claim 17, after "non-transitory" delete "transitory".

Signed and Sealed this  
Fourteenth Day of November, 2017

Joseph Matal  
*Performing the Functions and Duties of the*  
*Under Secretary of Commerce for Intellectual Property and*  
*Director of the United States Patent and Trademark Office*